Patented Apr. 22, 1947

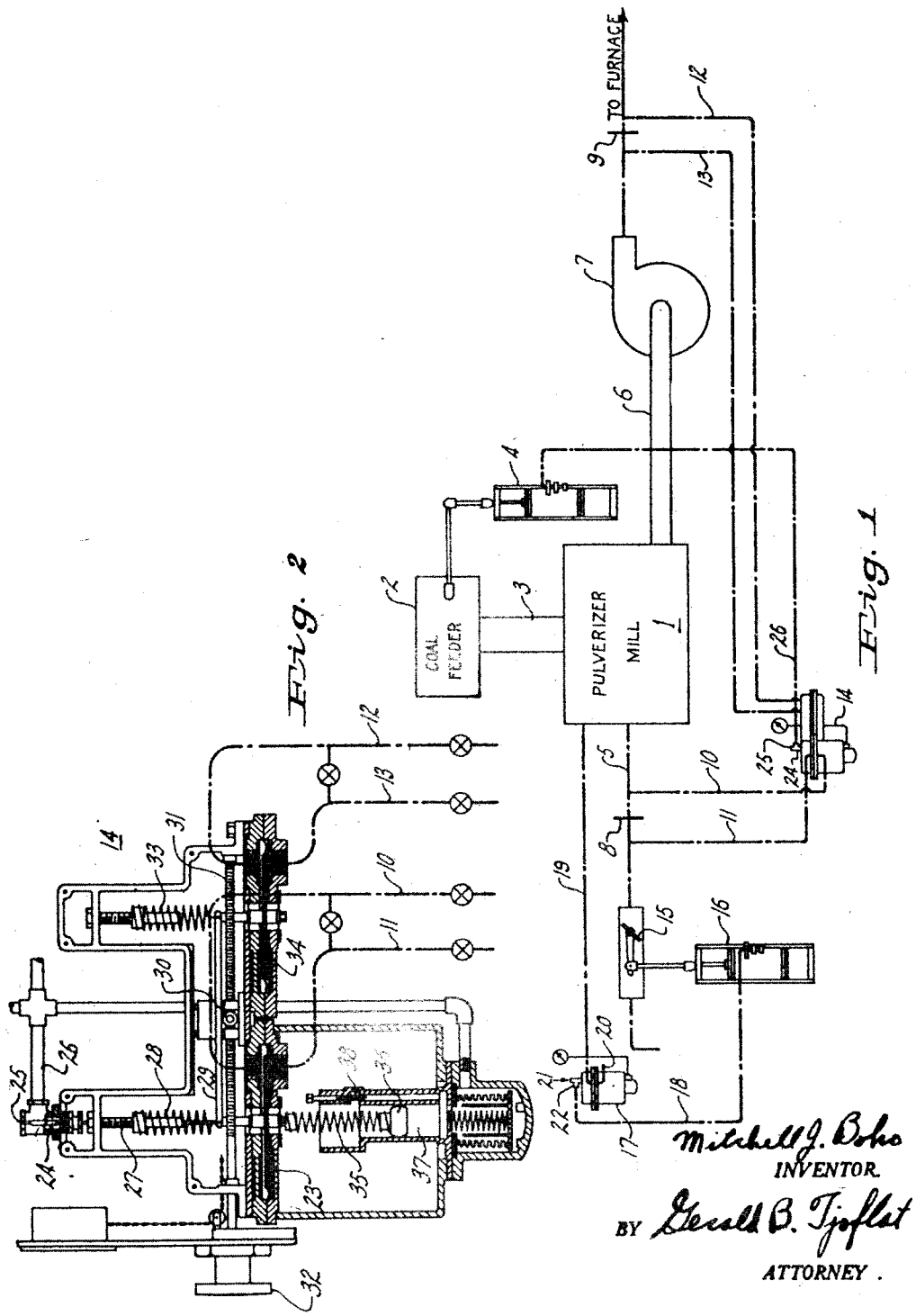

2,419,436

UNITED STATES PATENT OFFICE 2,419,436

COAL FEED AND AIR FLOW REGULATING SYSTEM FOR COAL PULVERIZING MILLS

Mitchell J. Boho, Brentwood, Pa., assignor to John M. Hopwood, Mount Lebanon, Pa.

Application December 1, 1943, Serial No. 512,672

6 Claims. (Cl. 241—34)

1

This invention relates to a system of control for regulating coal pulverizer mills to produce a mixture of powdered coal and air for delivery to a combustion system in accordance with the demand and a desired density of the fuel mixture.

It is among the objects of the invention to provide a system for controlling the air flow to a pulverizer mill in response to the suction in the mill created by the increase or variations in demand for fuel and to regulate the coal feed to the mill to maintain a predetermined density of the suspended coal charge delivered by the mill.

It is a further object of the invention to provide a system of control in which the coal fed to the pulverizer mill is regulated in accordance with a pressure balance across the air inlet and fuel outlet of the mill.

These and other objects of the invention will become more apparent from a consideration of the accompanying drawing constituting a part hereof in which, Fig. 1 is a diagrammatic view of a pulverizer mill and coal feeder with a system of control embodying the principles of this invention; and Fig. 2 is a vertical cross-sectional view partially in elevation of a regulator utilized in the control system of Fig. 1.

With reference to the several figures of the drawing the structure therein illustrated comprises a pulverizer mill 1, a coal feeder 2, connected by a hopper 3 to the pulverizer mill, the coal feeder being regulated by an operator or regulator 4 as will be hereinafter described. Air is supplied to the pulverizer mill by a supply line 5 and the pulverized fuel and air are delivered through line 6 by a suction fan 7 to a furnace as indicated by the arrow. A flow orifice 8 is provided in the air inlet line and a flow orifice 9 in the fuel delivery line, these orifices being respectively connected by pressure leads or conduits 10, 11, 12 and 13 to a regulator generally designated by the numeral 14 which is shown in the enlarged view of Fig. 2.

A damper 15 is provided to regulate the air flow to the pulverizer mill 1 and is actuated by an operator 16 that is controlled by a regulator 17 to which it is connected by a line 18. Regulator 17 is connected at 19 to the pulverizer mill to be responsive to the suction in the mill. Regulator 17 is of the diaphragm type in which the suction line 19 of the pulverizer mill is balanced on one side of the diaphragm against atmospheric pressure through the lead 20 on the opposite side of the diaphragm, so that in response to unbalanced pressure due to suction in the

2 pulverizer mill a sending pressure will be transmitted from a source of constant pressure designated by the arrow 21 through the valve 22 and line 18 to the operator 16 resulting in an adjustment of damper 15 to increase the airflow to the pulverizer mill through the inlet 5.

The coal feed operator or regulator 4 is regulated in response to the pressure differential across orifices 8 and 9 by regulator 14 as follows. The controlling diaphragm 23 operates valve 24 to control the flow of a constant source of pressure connected to valve 24 at 25 to transmit a sending pressure through the line 26 to the coal feed operator 4, Fig. 1.

Valve 24 is connected by valve stem 27 to a tension spring 28 secured to the end of a beam 29 having an adjustable fulcrum 30 movable by screw 31 through a hand wheel 32. The position of the fulcrum 30 is shown in indicator 30ª to which it is attached by chain 30ᵇ. One end of the beam 29 is connected by tension spring 33 to a loading diaphragm 34 which is responsive to a pressure differential in the lines 12 and 13 across the orifice 9. The controlling diaphragm 23 is responsive to the pressure differential in lines 10 and 11 connected across orifice 8. The controlling diaphragm is retarded in its movements by a compensating spring 35 connected to a dash pot piston 36 operative in fluid contained in the cylinder 37, the rate of movement of piston 36 being controlled by a needle valve 38 which controls the by-passing of the dash pot fluid.

The operation of the above described pulverizer mill coal feeder and system of control is briefly as follows. Regulator 14 is set by adjusting the fulcrum 30 to maintain a given ratio between the controlling diaphragm 23 and the loading diaphragm 34 to thereby maintain a given speed of operation of the coal feeder 2 for a given pressure drop across the orifice 8. If the furnace employs a multiple of burners or if the pulverizer mill supplies fuel for more than one furnace an increase in the demand of the pulverized fuel resulting from the use of additional burners will produce a suction in the pulverizing mill 1 which is transmitted through the line 19 to regulator 17. The diaphragm in regulator 17 which is like the controlling diaphragm 23 of regulator 14 operates a valve like the valve 24 to transmit a sending pressure from a source of constant pressure 21 through line 18 to the damper operator 16 which sets the damper 15 to the position to admit more air to the pulverizer mill.

Increased air flow in line 5 results in a greater pressure differential across orifice 8 which is transmitted through lines 10 and 11 to the controlling diaphragm 23 of regulator 14. The unbalanced pressure on diaphragm 23 operates valve 24 to admit air pressure from a constant source 25 into the sending line 26 of the coal feed operator or regulator 4 thereby increasing the rate of coal feed through hopper 3 to the pulverizer mill 1.

As the volume of coal increases in the delivery line 6 the increased density of the combined pulverized coal and air results in an increase in the pressure differential across orifice 9 which is transmitted through lines 12 and 13 to the loading diaphragm 34 of regulator 14 until the pressures on the diaphragms 23 and 34 are balanced to maintain the ratio for which fulcrum 30 has been set. In other words when the pressure drop across the air inlet orifice 8 is normal the sending pressure to the coal feed operator 4 will be reduced to continue to feed coal to the pulverizer mill 1 at the normal rate demanded by the furnace.

By this method of control a predetermined air supply is maintained to the pulverizer mill for any demand for fuel by the furnace and coal fed into the mill increases with the air supply to the mill to maintain a predetermined ratio of fuel and air in the delivery line 6.

While the invention has been illustrated and described as applied to a coal pulverizing mill for the purpose of demonstrating the utility thereof, it will be evident that the same system of control may be utilized for pulverizing other materials or for measuring of other materials for mixing with air or other fluids.

It is evident from the foregoing description of the invention that the pulverizer mill and its system of control is responsive to the demand for fuel to automatically maintain a fixed ratio of air and pulverized coal for any required volume of fuel delivered by the mill.

Although one embodiment of the invention has been herein illustrated and described it will be evident to those skilled in the art that various modifications may be made in the details of construction without departing from the principles herein set forth.

I claim:

1. In a control system for a pulverizer mill provided with a coal feeder, a source of air flowing to said mill, and an exhauster for withdrawing the air and pulverized fuel from said mill, said system comprising an orifice in the air flow line and an orifice in the fuel delivery line, means for controlling the air flow to said mill, an operator for said coal feeder, a regulator for said air flow control means operative in response to suction in said mill to maintain a predetermined suction condition therein and a regulator responsive to variations in the pressure differentials across the orifices in the air flow and fuel delivery lines for so controlling said coal feed operator that the rate of feed of coal to the mill will result in the maintenance of a predetermined relationship between the pressure differentials across said orifices.

2. In a pulverizer mill, a coal feeder, a source of air flowing to said mill, an exhauster for withdrawing the air and pulverizer fuel from said mill, a flow orifice in the air flow line and a flow orifice in the fuel delivery line, means for controlling the air flow to said mill, and an operator for said coal feeder, a regulator for said air flow control means operative in response to suction in said mill and a regulator having means responsive to variations in the pressure differential across the air flow orifice for causing the coal feed operator to regulate the rate of feed of coal in accordance with said differential across said air flow orifice said regulator being further provided with means responsive to the pressure differential across the orifice in the fuel delivery line for causing the coal feed to be so modified that a predetermined relationship is maintained between the pressure differentials across the orifices in said air flow and fuel delivery lines.

3. In a pulverizer mill, a coal feeder, a source of air flowing to said mill, an exhauster for withdrawing the air and pulverized fuel from said mill, a flow orifice in the air flow line and a flow orifice in the fuel delivery line, means for controlling the air flow to said mill, an operator for said coal feeder, a regulator operative in response to increase in demand on the mill to operate said air flow controlling means to increase the air flow and a regulator operative in response to variation in the pressure differential across the air flow orifice to increase the rate of coal feed to the mill, said last named regulator being responsive to the pressure differential across the fuel line orifice to maintain a rate of coal feed to the mill that bears a predetermined relationship to the differentials across said orifices.

4. In a pulverizer mill, a coal feeder, a source of air flowing to said mill, an exhauster for withdrawing the air and pulverized fuel from said mill, a flow orifice in the air flow line and a flow orifice in the fuel delivery line, means for controlling the air flow to said mill, an operator for said coal feeder, a regulator for said air flow control means operative in response to suction in said mill and a regulator responsive to variations in the pressure differentials across the orifices in the air flow and fuel delivery lines for regulating the speed of said coal feed operator, said last named regulator having adjustable means for maintaining a predetermined ratio between the differentials across the orifices in the air flow and the fuel delivery lines.

5. A control system for a coal pulverizer provided with an air supply pipe, an exhauster pipe for carrying air and coal in suspension from the pulverizer, a variable rate coal feeder for said mill, said system comprising means responsive to pressure conditions in the pulverizer for so regulating the rate of supply of air that a predetermined pressure condition is maintained in the pulverizer, an orifice in the air supply pipe, an orifice in the exhauster pipe, and means responsive to the pressure drops across said orifices for so controlling the coal feeder that a predetermined relationship is maintained between the pressure differentials across said orifices.

6. A control system for a pulverizer mill provided with a feeder for delivering material to be pulverized to the mill, a regulator for controlling the rate of feed of coal by said feeder, an air supply line for the mill, and an exhaust line connected to said mill for exhausting air and powdered material carried in suspension in said air, from said mill, means responsive to pressure conditions in the mill for so regulating the air supply that a predetermined pressure is maintained in the mill, an orifice in the air supply line, an orifice in the exhausting line, and means responsive to the pressure drops across said orifices for so controlling the operation of the feeder regulator that the rate of feed is in acordance with a predetermined relationship between the pressure drops across the orifices in the air supply line and the exhausting line.

MITCHELL J. BOHO.

REFERENCES CITED

The following references are of record in the file of this patent:

UNITED STATES PATENTS

| Number | Name | Date |
| --- | --- | --- |
| Re. 20,156 | Hardgrove | Nov. 3, 1936 |
| 2,292,243 | Schwartz | Aug. 4, 1942 |
| 2,298,257 | Reaser | Oct. 6, 1942 |
| 1,965,643 | Hardgrove | July 10, 1934 |